United States Patent
Cooper et al.

[15] 3,681,380

[45] Aug. 1, 1972

[54] THIAZOLINE AZETIDINONES

[72] Inventors: Robin D. G. Cooper; David S. Fukuda, both of Indianapolis, Ind.

[73] Assignee: Eli Lilly and Company, Indianapolis, Ind.

[22] Filed: Feb. 3, 1971

[21] Appl. No.: 112,390

[52] U.S. Cl............260/306.7, 260/239.1, 260/243 C
[51] Int. Cl. .............................................C07d 99/10
[58] Field of Search....................................260/306.7

[56] References Cited

UNITED STATES PATENTS 3,422,103  1/1969  Wall et al. ................260/243 C
3,522,266  7/1970  Woodward ................260/306.7

*Primary Examiner*—Alex Mazel
*Assistant Examiner*—R. J. Gallagher
*Attorney*—Everet F. Smith and Leroy Whitaker

[57] ABSTRACT

Novel 2-substituted thiazoline azetidinones are obtained from 2,6-disubstituted thiazoline azetidinones by treatment with lead tetraacetate followed by hydrolysis. The novel 2-substituted thiazoline azetidinones are reduced by treatment with aluminum amalgam or sodium borohydride to the corresponding thiazolidine azetidinones which are useful in the synthesis of penicillins and cephalosporins.

8 Claims, No Drawings

THIAZOLINE AZETIDINONES

BACKGROUND OF THE INVENTION

Following the discovery of the strong antibiotic activity of the cephalosporin compounds, much effort has been devoted to the synthesis of members of this family. Some synthetic approaches by Woodward and co-workers are described in British Pats. Nos. 1,155,017 through 1,155,030 and German Offenlegungsschrift Nos. 1,935,459, 1,935,638, and 1,935,970. Syntheses by Sheehan are described in U.S. Pats. Nos. 3,487,070, through 3,487,072, 3,487,074, 3,487,079, and 3,487,090.

Of particular interest are U.S. Pat. No. 3,487,074, which describes the synthesis of penicillin and cephalosporin compounds by the reaction of azetidinones with selected esters, and British Pat. No. 1,155,024, which describes the preparation of 7-acylaminocephalosporanic acids from thiazolidine azetidinones. The various steps involved in the synthesis of the thiazolidine azetidinones and their conversion to cephalosporanic acids are claimed in the above-named British patents.

SUMMARY

We have now discovered a novel class of thiazoline azetidinones which can be obtained from 2,6-disubstituted thiazoline azetidinones by treatment with lead tetraacetate followed by hydrolysis. The 2,6-disubstituted thiazoline azetidinone starting materials are prepared by the rearrangement of penicillins. Our novel thiazoline azetidinones are reduced by treatment with aluminum amalgam or sodium borohydride to thiazolidine azetidinones which are useful in the synthesis of penicillins and cephalosporins by the methods described in U.S. Pat. No. 3,487,074 and British Pat. No. 1,155,024.

DESCRIPTION OF THE PREFERRED EMBODIMENT

The thiazoline azetidinones of our invention are those having the formula

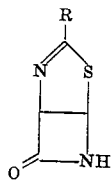

wherein R is hydrogen;
methoxy;
carbomethoxy;
$C_1$–$C_8$ alkyl, optionally substituted with hydroxy, mercapto, $C_1$–$C_3$ alkoxy, $C_1$–$C_3$ alkylthio, or cyano;
$C_1$–$C_8$ alkenyl, optionally substituted with hydroxy, mercapto, $C_1$–$C_3$ alkoxy, $C_1$–$C_3$ alkylthio, or cyano; $C_3$–$C_8$ cycloalkyl, optionally substituted with hydroxy, mercapto, $C_1$–$C_3$ alkoxy, $C_1$–$C_3$ alkylthio, or cyano;

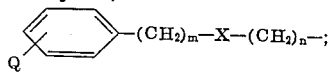

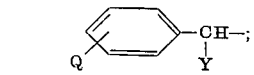

or

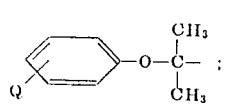

Q is hydrogen, hydroxy, mercapto, chloro, bromo, $C_1$–$C_3$ alkyl, $C_1$–$C_3$ alkoxy, $C_1$–$C_3$ alkylthio, nitro or cyano;
X is oxygen, sulfur, or a carbon to carbon bond;
Y is hydroxy, mercapto, or amino;
$m$ is an integer of 0 to 2; and
$n$ is an integer of 1 to 2.

Our novel thiazoline azetidinones are prepared from 2,6-disubstituted thiazoline azetidinones having the formula

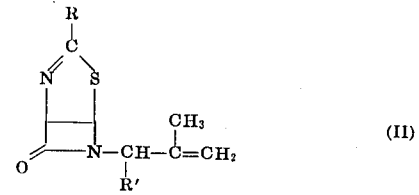

wherein R is as defined above and

R' is —$CO_2H$ or —$CH_2OH$

The 2,6-disubstituted thiazoline azetidinones used as starting materials are obtained in turn from the rearrangement of a penicillin in accordance with the method described in Cooper copending application Serial No. 72,213, filed Sept. 14, 1970.

The rearrangement of the penicillin is not a part of the present invention but for completeness the method will be described. This rearrangement involves the treatment of a penicillin sulfoxide having the formula

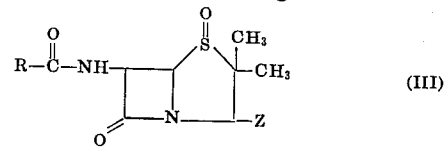

wherein R is as defined above and Z is hydroxymethyl or esterified carboxyl, with at least one treated of triphenyl phosphine or a trialkyl phosphite at a temperature of 40° to 125° C. The alkyl groups of the trialkyl phosphite should contain from one to four carbon atoms. This process will be illustrated in the examples.

In accordance with the process of our invention a 2,6-disubstituted thiazoline azetidinone of formula II is treated with lead tetraacetate which results in the replacement of R' with an acetoxy group. Hydrolysis of the acetoxy derivative results in the loss of the side chain with formation of a novel 2-substituted thiazoline azetidinone of formula I. This process is depicted by the following equations.

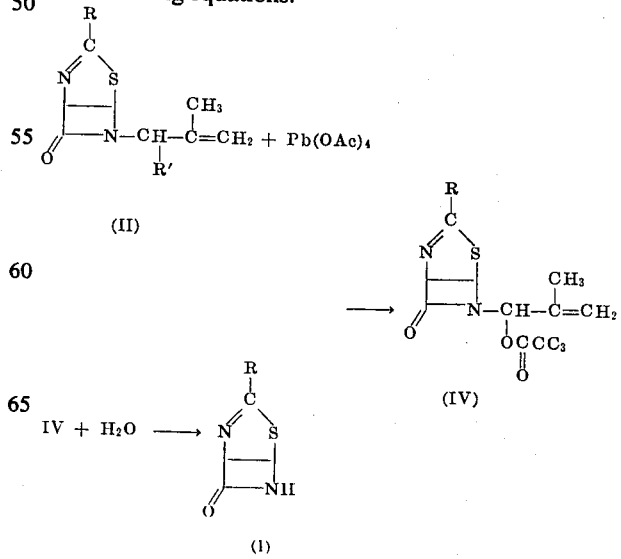

In the first step of our process a compound of formula II is treated with at least one mole of lead tetraacetate to effect replacement of the R' group with an acetoxy group. Preferably, a slight excess of the lead tetraacetate, such as for example 1.1 mole, is used. The reaction proceeds readily at temperatures within the range of 50° to 100° C. in an inert solvent such as tetrahydrofuran, t-butyl alcohol, dioxane, ethers, benzene, chlorobenzene, ethyl acetate or pyridine. The reaction is allowed to proceed until a negative starch/potassium iodide test is obtained.

The hydrolysis step is conducted at a pH within the range of 7 to 10, and preferably within the range of 7 to 8, by treatment with water, preferably in a water-miscible solvent such as tetrahydrofuran, dioxane, methanol, or ethanol. The hydrolysis proceeds readily at ambient temperatures although long reaction times on the order of several hours are required. The course of the hydrolysis step is readily followed by thin layer chromatography.

As can be readily seen from the manner in which the 2,6-disubstituted thiazoline azetidinone starting material is prepared, the values of R and R' in the thiazoline azetidinone are functions of the penicillin starting material. These groups carry through from the penicillin. In turn, the R group continues on unchanged to the novel 2-substituted thiazoline azetidinones of our invention so that the value of R in our novel compounds is dependent upon the penicillin starting material.

The value of R depends, of course, upon the particular carboxamido group attached to the penicillin in the 6-position. Literally hundreds of such carboxamido groups are known in the prior art. Many are described for example, in U.S. Pats. Nos. 2,941,995, 2,951,839, 2,985,648, 2,996,501, 3,007,920, 3,025,290, 3,028,379, 3,035,047, 3,040,032, 3,040,033, 3,041,332, 3,041,333, 3,043,831, 3,053,831, 3,071,575, 3,071,576, 3,079,305, 3,079,306, 3,080,356, 3,082,204, 3,093,547, 3,093,633, 3,116,285, 3,117,119, 3,118,877, 3,120,512, 3,120,513, 3,120,514, 3,127,394, 3,140,282, 3,142,673, 3,147,247, 3,174,964, 3,180,863, 3,198,804, 3,202,653, 3,202,654, 3,202,655, 3,210,337, 3,157,639, 3,134,767, and 3,132,136. Thus, the values of R given following formula I are merely illustrative of the many, many values which R may assume based on the prior art. Representative of the R groups described in the formula are methyl, ethyl, octyl, hydroxyethyl, 3-methoxypropyl, cyanomethyl, vinyl, allyl, hexen-2-yl, propynyl, pentyn-3-yl, benzyl, α-hydroxybenzyl, α-aminobenzyl, α-azidobenzyl, phenoxymethyl, benzyloxyethyl, α-amino-m-nitrobenzyl, p-methoxyphenylthiomethyl, and p-chlorobenzyl. The preferred compounds of our invention are those wherein R is hydrogen, carbomethoxy, benzyl, phenoxymethyl, or 2-phenoxyisopropyl.

It is understood that all hydroxyl, mercapto, and amino groups present in the starting 2,6-disubstituted thiazoline azetidinone other than in R' are protected prior to treatment with lead tetraacetate to prevent reaction of such groups. It is common practice in organic chemistry to protect such groups by formation of a derivative which can later by converted back to the original group. For example, hydroxyl groups are converted to easily cleaved esters such as the formate. Mercapto groups are readily protected by oxidation to the disulfide. Amines are commonly protected by acylation or by introduction of a group such as benzyloxycarbonyl, butyloxycarbonyl, or trichloroethoxycarbonyl.

Although penicillins having a variety of substituents in the 3-position are known, the ones of interest to this invention are those wherein Z is an esterified carboxyl or hydroxymethyl group or a group that can be readily converted to one of such groups. Thus, for example, Z may be an esterified carboxyl group which will go through the rearrangement step unchanged. Prior to treatment with lead tetraacetate the ester is cleaved to give the free carboxyl group.

The preparation of our novel 2-substituted thiazoline azetidinones will be further illustrated by the following examples. The first example is not a part of the present invention but merely illustrates the preparation of the 2,6-disubstituted thiazoline azetidinone starting materials of this invention.

EXAMPLE 1

A mixture of 1.36 g. of the trichloroethyl ester of penicillin G sulfoxide and 1 ml. of trimethyl phosphite in 50 ml. of benzene was heated under reflux for 36 hours. The solution was washed well with water, the solvent was removed under vacuum, leaving a white solid which was recrystallized from methanol to give 985 mg. of white needles melting at 145° C. This product was confirmed by nuclear magnetic resonance spectroscopy to be a compound having structure II wherein R is benzyl and R' is trichloroethoxycarbonyl.
Analysis:
Calculated for $C_{18}H_{17}N_2O_3Cl_3S$: C, 48.27; H, 3.83; N, 6.25; Cl, 23.75; S, 7.16.
Found: C, 48.51; H, 3.59; N, 6.48; Cl, 23.54; S, 7.30.

EXAMPLE 2

A solution of 330 mg. of compound II (R=phenoxymethyl and R'=carboxyl) and 460 mg. of lead tetraacetate in 25 ml. of benzene was heated under reflux for 1 hour. At the end of this time a negative starch/potassium iodide test was obtained. The reaction mixture was washed with water, dried over magnesium sulfate and the solvent removed in vacuo to yield a pale yellow oil. Thin layer chromatography in ethyl acetate/benzene (3:7) showed the product to contain only one component. The yield was 293 mg. An NMR spectrum confirmed the structure as that of Formula II wherein R is phenoxymethyl and R' is acetoxy.

EXAMPLE 3

A solution of 12 grams of compound II (R=phenoxymethyl and R'=hydroxymethyl) and 17.6 g. of lead tetraacetate in 350 ml. of dry benzene was heated under reflux for one hour. Thin layer chromatography showed the reaction to be complete. The reaction mixture was cooled, filtered through filtercel and washed with water. The lead oxide which precipitated was removed by filtration and the filtrate was washed several times with sodium bisulfite solution, then several times with water. The benzene solution was dried over magnesium sulfate and evaporated in vacuo to give a very thick syrup. This product was dried under vacuum pump pressure for 24 hours to yield 11 g. of an orange syrup. An NMR spectrum showed the hydroxymethyl group to have been replaced by an acetoxy group.

EXAMPLE 4

A buffer solution was prepared by dissolving 300 mg. of dipotassium acid phosphate in 300 ml. of water and adjusting the pH of the solution to 7.6 by the addition of hydrochloric acid. This mixture was autoclaved for 20 minutes at 120° C. at 15 psi. To the buffer solution was added a solution of 300 mg. of a compound prepared as in Example 2 in 10 ml. of methanol. The turbid mixture was incubated on a rotary shaker at 30° C. After three hours a 10 ml. sample of the reaction mixture was extracted with ethyl acetate and the ethyl acetate solution dried. The residue was spotted on silica gel F using a 7:3 mixture of ethyl acetate and benzene as solvent. This thin layer chromatogram showed the sample to contain a small amount of unreacted starting material, but to be primarily a compound of Formula I wherein R is phenoxymethyl. The reaction was allowed to continue for another 21 hours at which time globules of undissolved starting material were separated and the remainder of the reaction mixture was extracted three times with equal volumes of ethyl acetate. The pooled ethyl acetate extract was dried over sodium sulfate, filtered, and evaporated to dryness. An oily residue weighing 239 mg. was obtained. A 1.8 centimeter by 45 centimeter silica gel chromatography column was prepared by slurrying 40 g. of 60 × 200 silica gel in benzene and pouring the mixture into a glass column. The residue from the ethyl acetate extracts was dissolved in a small quantity of benzene and ethyl acetate and put on the column. The column was eluted first with benzene, then with benzene/ethyl acetate mixtures, and finally with ethyl acetate. Ten ml. fractions were collected. Every tenth column fraction was dried and spotted on thin layer chromatography. The results revealed the elution of the desired product (compound I wherein R=phenoxymethyl) in a 9:1 benzene/ethyl acetate solvent mixture. On drying this fraction from the column, 6 mg. of white material was obtained. The nuclear magnetic resonance spectrum confirmed the structure to be that of Compound I wherein R is phenoxymethyl.

EXAMPLE 5

A solution of 300 mg. of a material prepared as in Example 2 in 10 ml. of methanol was added to a solution of 300 mg. of dipotassium acid phosphate in 300 ml. of water whose pH had been adjusted to 7–8 by the addition of hydrochloric acid. The solution was stirred at room temperature for 16 hours and the product was separated by preparative thin layer chromatography into six fractions. Fraction D was recrystallized from methanol to yield a white solid having a melting point of 154° C. and which was shown by nuclear magnetic resonance spectroscopy to be the same phenoxymethyl thiazoline azetidinone obtained in Example 4.

Our novel thiazoline azetidinones may be reduced to thiazolidine azetidinones by treatment with aluminum amalgam or sodium borhydride. This reduction if described in Cooper copending application Ser. No. 112,389, filed of even date herewith. This reduction is illustrated by the following example.

EXAMPLE 6

A solution of 1.5 g. of the product from Example 4 or 5 in 250 ml. of tetrahydrofuran containing a few drops of water was stirred with freshly prepared aluminum amalgam. Thin layer chromatography showed no starting material after 2 ½ hours. The mixture was filtered through a layer of filtercel and magnesium sulfate and the filtrate was evaporated. The residue was shaken with ether and the ether evaporated. The residue was then flushed several times with ether. Ten ml. of ether was added and crystals separated and were removed by filtration. The product (546 mg.) was repeatedly washed with ether until no phenol was detected by thin layer chromatography. The product was confirmed by nuclear magnetic resonance spectroscopy and elemental analysis to have the following structure

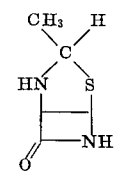

In the preceding example the phenoxy group was lost during the reduction. Use of sodium borohydride to bring about reduction does not result in loss of the phenoxy group.

The thiazolidine azetidinones obtained by reduction of our thiazoline azetidinones may be converted to penicillin and cephalosporin antibiotics according to the procedure described in U.S. Pat. No. 3,487,074. The thiazolidine azetidinones are substituted for the azetidinones of the patent. This conversion to penicillins and cephalosporins is depicted by the following equations.

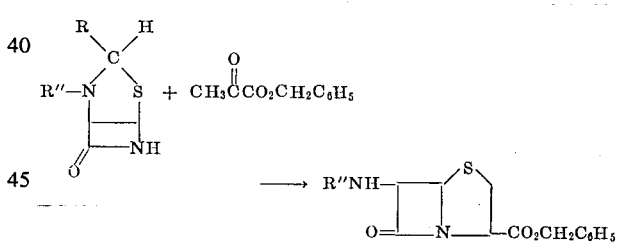

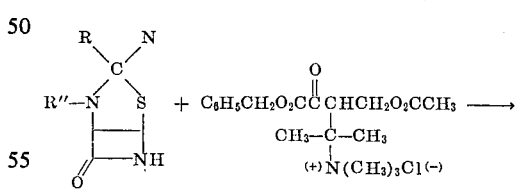

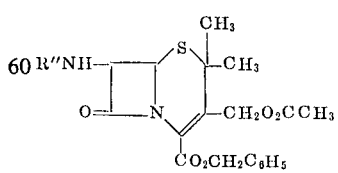

Cephalosporins may be obtained in accordance with the process of British Pat. No. 1,155,024 as shown by the following equations.

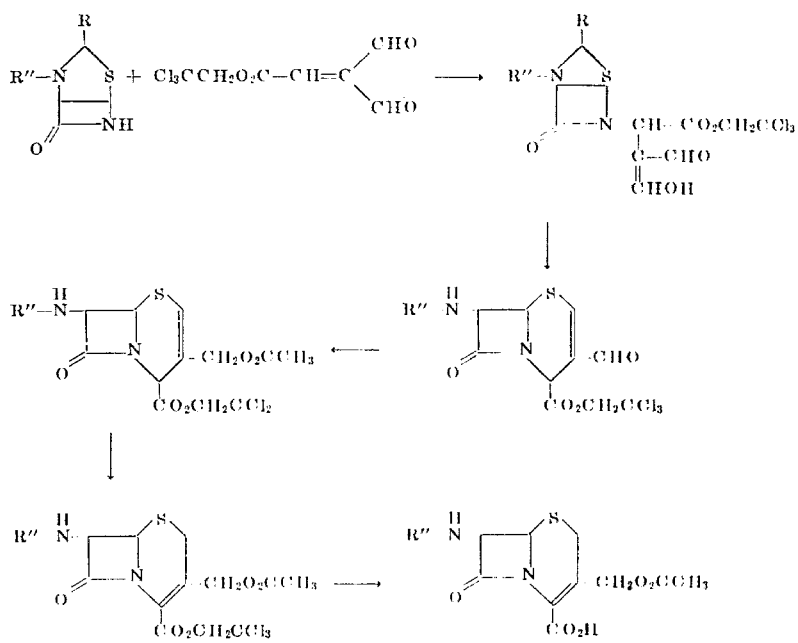

We claim:
1. A thiazoline azetidinone having the formula

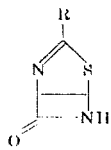

wherein R is hydrogen;
  methoxy;
  carbomethoxy;
  $C_1$–$C_8$ alkyl, optionally substituted with hydroxy, mercapto, $C_1$–$C_3$ alkoxy, $C_1$–$C_3$ alkylthio, or cyano;
  $C_2$–$C_8$ alkenyl, optionally substituted with hydroxy, mercapto, $C_1$–$C_3$ alkoxy, $C_1$–$C_3$ alkylthio, or cyano;
  $C_3$–$C_8$ cycloalkyl, optionally substituted with hydroxy, mercapto, $C_1$–$C_3$ alkoxy, $C_1$–$C_3$ alkylthio, or cyano;

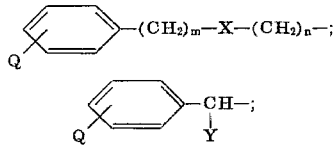

or

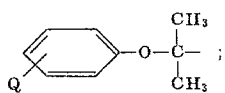

Q is hydrogen, hydroxy, mercapto, chloro, bromo, $C_1$–$C_3$ alkyl, $C_1$–$C_3$ alkoxy, $C_1$–$C_3$ alkylthio, nitro or cyano;
X is oxygen, sulfur, or a carbon to carbon bond;
Y is hydroxy, mercapto, or amino;
$m$ is an integer of 0 to 2; and
$n$ is an integer of 1 to 2.

2. A thiazoline azetidinone as in claim 1 wherein R is hydrogen.

3. A thiazoline azetidinone as in claim 1 wherein R is carbomethoxy.

4. A thiazoline azetidinone as in claim 1 wherein R is benzyl.

5. A thiazoline azetidinone as in claim 1 wherein R is 2-phenoxyisopropyl.

6. A thiazoline azetidinone as in claim 1 wherein R is phenoxymethyl.

7. A method for the preparation of a thiazoline azetidinone having the formula:

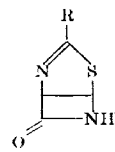

wherein R is hydrogen;
  methoxy;
  carbomethoxy;
  $C_1$–$C_8$ alkyl, optionally substituted with hydroxy, mercapto, $C_1$–$C_3$ alkoxy, $C_1$–$C_3$ alkylthio, or cyano;
  $C_2$–$C_8$ alkenyl, optionally substituted with hydroxy, mercapto, $C_1$–$C_3$ alkoxy, $C_1$–$C_3$ alkylthio, or cyano;
  $C_3$–$C_8$ cycloalkyl, optionally substituted with hydroxy, mercapto, $C_1$–$C_3$ alkoxy, $C_1$–$C_3$ alkylthio, or cyano;

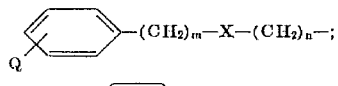

or

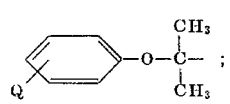

Q is hydrogen, hydroxy, mercapto, chloro, bromo, $C_1$–$C_3$ alkyl, $C_1$–$C_3$ alkoxy, $C_1$–$C_3$ alkylthio, nitro or cyano;

X is oxygen, sulfur, or a carbon to carbon bond;
Y is hydroxy, mercapto, or amino;
*m* is an integer of 0 to 2; and
*n* is an integer of 1 to 2,
which comprises treating a thiazoline azetidinone having the formula

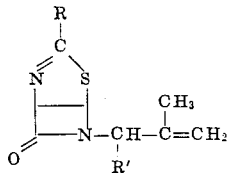

wherein R is as defined above and
R′ is CO₂H or —CH₂OH with at least one mole of lead tetraacetate at a temperature of 50° to 100° C., followed by treatment with water at a pH within the range of 7 to 10.

8. A method as in claim 7 wherein the treatment with water is conducted at a pH of 7 to 8.

* * * * *